United States Patent
Kelly

(10) Patent No.: US 10,801,414 B2
(45) Date of Patent: Oct. 13, 2020

(54) GAS TURBINE ENGINE INCLUDING A RECTIFIERLESS ELECTRONIC CONTROL UNIT AND METHOD FOR SUPPLYING POWER TO SAME

(71) Applicant: HONEYWELL INTERNATIONAL INC., Morris Plains, NJ (US)

(72) Inventor: Jeff M. Kelly, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 775 days.

(21) Appl. No.: 15/413,681

(22) Filed: Jan. 24, 2017

(65) Prior Publication Data

US 2018/0209348 A1 Jul. 26, 2018

(51) Int. Cl.
*F02C 7/266* (2006.01)
*F02P 15/00* (2006.01)
(Continued)

(52) U.S. Cl.
CPC ........... *F02C 7/266* (2013.01); *F02P 3/00* (2013.01); *F02P 3/0838* (2013.01);
(Continued)

(58) Field of Classification Search
CPC . F02C 7/266; F02C 7/26; F02P 15/003; F02P 3/0838; F02P 3/0884; F02P 3/00;
(Continued)

(56) References Cited

U.S. PATENT DOCUMENTS 2,496,502 A * 2/1950 Steensma ................ F02C 7/262
315/205
3,921,053 A * 11/1975 Hekimian ............... H02M 3/28
363/16

(Continued)

FOREIGN PATENT DOCUMENTS

EP 2733312 A2 5/2014
JP 2002349406 4/2002

OTHER PUBLICATIONS

"Rectifier." Wikipedia, The Free Encyclopedia. Wikipedia, The Free Encyclopedia. Nov. 3, 2015. Web. Obtained Aug. 29, 2019 Internet Archive [https://web.archive.org/web/20151103224206/https://en.wikipedia.org/wiki/Rectifier] (Year: 2015).*

(Continued)

*Primary Examiner* — Alain Chau
(74) *Attorney, Agent, or Firm* — Lorenz & Kopf, LLP

(57) ABSTRACT

A gas turbine engine comprises an electronic control unit adapted to control functions of the gas turbine engine and having a DC power input unit coupled to receive DC supply power and an ignition igniter coupled thereto. The ignition exciter includes an AC power input unit adapted to receive AC power from an AC power source within the gas turbine engine, a power rectification unit coupled to receive the AC power from the AC power source and configured, upon receipt thereof, to rectify the AC power into DC power, and a DC power output unit coupled to receive the DC power from the power rectification unit and configured to supply (Continued)

the DC power to the DC power input unit of the electronic control unit as DC supply power and/or the ignition igniter.

10 Claims, 3 Drawing Sheets

(51) Int. Cl.

| | | |
|---|---|---|
| *H02M 7/06* | (2006.01) | |
| *H02M 7/00* | (2006.01) | |
| *F02P 3/08* | (2006.01) | |
| *H02M 1/00* | (2006.01) | |
| *F02P 9/00* | (2006.01) | |
| *F02P 3/12* | (2006.01) | |
| *F02P 3/00* | (2006.01) | |

(52) U.S. Cl.
CPC ............... *F02P 3/0884* (2013.01); *F02P 3/12* (2013.01); *F02P 9/002* (2013.01); *F02P 15/003* (2013.01); *H02M 7/00* (2013.01); *H02M 7/06* (2013.01); *F05D 2220/764* (2013.01); *F05D 2220/768* (2013.01); *F05D 2260/99* (2013.01); *H02M 2001/0006* (2013.01); *Y02T 50/671* (2013.01)

(58) Field of Classification Search
CPC .. F02P 3/12; F02P 9/002; H02M 7/00; H02M 7/06; H02M 2001/0006; F05D 2220/762; F05D 2220/764; F05D 2220/768; F05D 2260/99; Y02T 50/671
See application file for complete search history.

(56) References Cited

U.S. PATENT DOCUMENTS

| | | | | |
|---|---|---|---|---|
| 4,039,804 A * | 8/1977 | Reed | ............. | F02C 9/32 700/287 |
| 4,259,835 A * | 4/1981 | Reed | ............. | F02C 9/28 60/39.281 |
| 5,069,032 A * | 12/1991 | White | ............. | F02C 6/00 60/39.821 |
| 5,155,437 A * | 10/1992 | Frus | ............. | F02C 7/266 324/380 |
| 5,473,502 A * | 12/1995 | Bonavia | ............. | F02P 3/0838 123/145 A |
| 5,488,536 A * | 1/1996 | Bonavia | ............. | F02P 7/035 123/596 |
| 5,656,966 A * | 8/1997 | Wilmot | ............. | F02P 7/035 257/E29.023 |
| 5,852,381 A | 12/1998 | Wilmot et al. | | |
| 6,104,143 A * | 8/2000 | Bonavia | ............. | F02P 3/0884 315/209 CD |
| 6,191,536 B1 * | 2/2001 | Dolmovich | ............. | F02P 3/0838 257/E29.219 |
| 6,265,786 B1 | 7/2001 | Bosley et al. | | |
| 6,603,216 B2 | 8/2003 | Costello | | |
| 6,670,777 B1 * | 12/2003 | Petruska | ............. | F02P 3/0876 123/598 |
| 7,355,300 B2 * | 4/2008 | Wilmot | ............. | F02P 15/003 257/E29.216 |
| 7,513,119 B2 * | 4/2009 | Zielinski | ............. | F02C 7/262 60/204 |
| 7,768,767 B2 * | 8/2010 | Dooley | ............. | F02P 3/0807 361/253 |
| 8,266,885 B2 * | 9/2012 | Wright | ............. | F02P 3/0892 315/209 CD |
| 8,359,869 B2 * | 1/2013 | Wright | ............. | F02P 3/0892 60/39.821 |
| 9,429,321 B2 * | 8/2016 | Zacarchuk | ............. | F02K 9/95 |
| 10,378,445 B2 * | 8/2019 | Edwards | ............. | F02C 9/30 |
| 10,473,033 B2 * | 11/2019 | Kelly | ............. | F02C 7/266 |
| 2003/0067284 A1 | 4/2003 | Costello | | |
| 2004/0000878 A1 | 1/2004 | Petruska et al. | | |
| 2004/0129241 A1 * | 7/2004 | Freen | ............. | F02C 7/266 123/143 B |
| 2006/0168968 A1 * | 8/2006 | Zielinski | ............. | F02C 7/262 60/778 |
| 2007/0256426 A1 * | 11/2007 | Dooley | ............. | F02C 7/266 60/776 |
| 2013/0111914 A1 * | 5/2013 | Kempinski | ............. | F02C 7/266 60/772 |
| 2014/0245748 A1 * | 9/2014 | Anghel | ............. | F02C 7/36 60/783 |
| 2015/0077896 A1 * | 3/2015 | Zacarchuk | ............. | F23Q 3/006 361/256 |
| 2015/0260107 A1 | 9/2015 | Wright | | |
| 2015/0315980 A1 * | 11/2015 | Edwards | ............. | F02C 7/22 60/772 |
| 2018/0034395 A1 * | 2/2018 | Huang | ............. | H02M 7/06 |
| 2018/0106196 A1 * | 4/2018 | Kelly | ............. | F01D 25/18 |

OTHER PUBLICATIONS

Extended EP Search Report for Application No. 18153106.2 dated Jun. 20, 2018.

* cited by examiner

GAS TURBINE ENGINE INCLUDING A RECTIFIERLESS ELECTRONIC CONTROL UNIT AND METHOD FOR SUPPLYING POWER TO SAME

TECHNICAL FIELD

The present invention generally relates to gas turbine engines and more particularly relates to an electronic control unit which controls a variety of functions of the gas turbine engine. Furthermore, the invention also relates to a method and an ignition igniter of a gas turbine engine which is capable of supplying energy to the electronic control unit of the gas turbine engine.

BACKGROUND

A typical gas turbine engine includes at least a compressor section, a combustion section and a turbine section. In order to control the functions of each of these sections, an electronic control unit (ECU) is typically used. The ECU may be mounted at or near a housing of the gas turbine engine and is typically energized from an AC power source. The AC power source is typically connected to the ECU via wiring harnesses, which are shielded from lightning strikes or other electromagnetic interference (EMI).

One of the main functions of the ECU is controlling the ignition system, more particularly to supply relatively high voltage power to the gas turbine engine ignition system. The ignition system of a gas turbine engine typically includes an ignition exciting unit (ignition exciter) and an ignition igniting unit (ignition igniter) (similar to a spark plug in a combustion engine). The ignition exciter comprises a discharge circuit that, when it discharges, generates a spark in the ignition igniter for igniting an air-fuel mixture in the combustion section. The discharge circuit typically receives DC power for charging a capacitive circuit which is provided as a shunt in parallel to the discharge gap of the ignition igniter. When the discharge voltage exceeds a certain threshold voltage, the air gap is ionized, causing the discharge spark to be generated. Thereafter, the charging circuit is repetitively charged by the capacitive circuit for the repetitive generation of a discharge spark in the discharge gap for starting the operation of the gas turbine engine.

As may be appreciated, the ECU typically supplies relatively high DC power (DC voltage) to the charging circuits of the ignition exciter so that a sufficient charge builds up for the discharge gap to be ionized. Therefore, the ECU typically includes an AC/DC power rectifier capable of supplying the relatively high DC voltage to the discharge gap (or respectively to the charging circuits), e.g. approximately 10-20 kV. Since power rectification, in particular at higher voltage levels, is an electromagnetically "noisy" process, circuits inside the ECU, and the electrical wiring connecting it to the AC power source or electrical circuits in the vicinity, can experience substantial EMI.

Furthermore, not only does power rectification at relatively high voltage/current level generate electromagnetic interferences, it also generates substantial heat from which other circuits need to be shielded. Thus, power rectification inside the ECU at such high powers also requires highly reliable and heat-resistant components. This in turn increases the costs of the ECU.

Hence, power rectification inside the ECU can exhibit undesirable thermal effects and increased EMI threat. Power rectification inside the ECU may also increase the likelihood of indirect lightning strikes, via the power cables from the power source. This further increases the costs of the ECU. Furthermore, current US regulatory requirements dictate increasing the redundancy of circuit design and architecture, which increases the physical size of the ECU. Consequently, the EMI problems and regulations also lead to a larger footprint (and weight) inside the ECU, which is already challenged for space.

Thus, there is a need for a gas turbine engine having an electronic control unit and ignition system that uses relatively less components and/or occupies less space and/or weight than existing systems while supplying sufficient DC power to generate the ignition spark. The present invention addresses one or more of these needs. In particular, the present invention aims at providing a gas turbine engine and an electronic control unit as well as an ignition exciter and a method for driving the electronic control unit for providing an effective supply of power to the electronic control unit and the ignition exciter.

BRIEF SUMMARY

In one embodiment, a gas turbine engine comprises an electronic control unit adapted to control functions of the gas turbine engine and having an DC power input unit coupled to receive DC supply power and an ignition exciter, wherein the ignition exciter comprises an AC power input unit adapted to receive AC power from an AC power source within the gas turbine engine, a power rectification unit coupled to receive the AC power from the AC power source and configured, upon receipt thereof, to rectify the AC power into DC power, and a DC power output unit coupled to receive the DC power from the power rectification unit and configured to supply the DC power to the DC power input unit of the electronic control unit as DC supply power.

In another embodiment, a method for supplying DC power to an electronic control unit of a gas turbine engine, wherein the electronic control unit has a DC power input unit adapted to received DC supply power and is devoid of any internal power rectification circuit, comprises the step of generating AC power by an AC power source of the gas turbine engine, the step of supplying the generated AC power to an ignition exciter of the gas turbine engine, the step of rectifying said AC power in said ignition exciter into DC power, and the step of supplying said DC power to the DC power input unit of said electronic control unit as DC supply power.

In another embodiment, an electronic control unit of a gas turbine engine is devoid of any internal power rectification unit and has a DC power input unit adapted to received DC supply power.

According to these embodiments of the invention, the technical problem of energy rectification inside the electronic control unit and for supplying energy to the control unit is solved. In particular, according to the embodiments of the invention, the technical problem of power rectification inside the electronic control unit is solved by sending non-rectified electrical power from an AC power source directly to the ignition exciter mounted on the gas turbine engine. The ignition exciter has the traditional requirement but in addition has a power rectification unit that rectifies the AC power from the AC power source to usable DC power. The DC power is used as needed by the ignition exciter, for example for charging the charging circuit therein to cause the generation of a discharge spark in the discharge gap, and in addition the rectified DC power is sent to the electronic control unit as a supply power. The rectified power sent to the ECU is used in a highest wins architecture with aircraft battery DC power. This solves the problem of rectifying AC power inside the electronic control unit, decreases the physical size of the electronic control unit, increases the reliability of the ECU and locates the rectification circuitry straight inside the highest demand control system component (the ignition exciter) for a higher system efficiency. The electromagnetic interference problems and lightning threats in the ECU itself are solved because the ECU receives the DC power that it requires for operation directly from the ignition exciter rather than performing the power rectification inside.

Further advantageous features and improvements of the invention will become apparent from the subsequent detailed description and the appended claims, taken in conjunction with the accompanying drawings and the preceding background.

BRIEF DESCRIPTION OF THE DRAWINGS

Hereinafter, the present invention will be described in conjunction with the following drawing figures in which similar reference numerals denote similar elements or steps. In the drawings.

DETAILED DESCRIPTION

Hereinafter, embodiments of the present invention are described with reference to the attached drawings. However, it should be noted that the following detailed description is merely exemplary in nature and is not intended to limit the invention or the application and uses of the invention. As used herein, the word "exemplary" means "serving as an example, instance, or illustration". Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary of the following detailed description.

Figure 1:
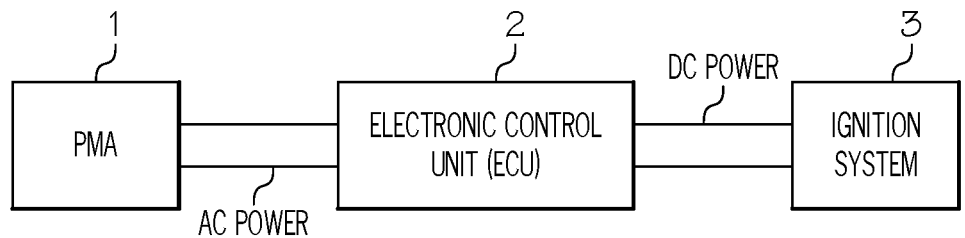
FIG. 1 shows a functional block diagram of a conventional system for supplying DC power to an ignition system.
Figure 2:
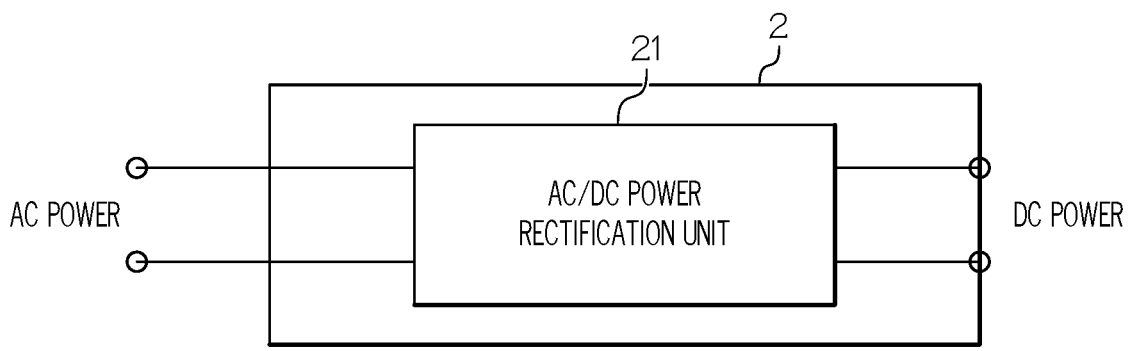
FIG. 2 is a schematic diagram of a conventional electronic control unit and a conventional ignition system.
Figure 2:
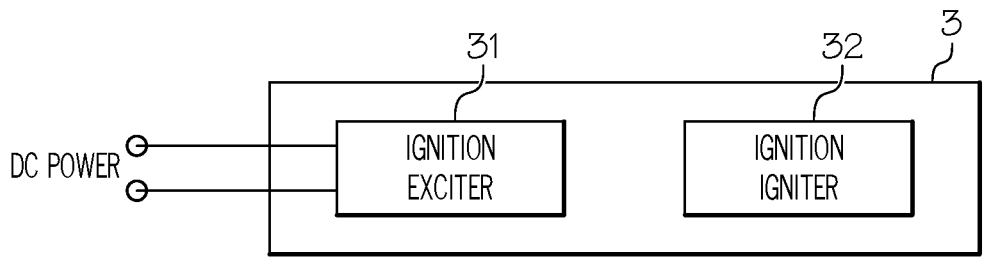

Referring now to FIG. 1 and FIG. 2, a conventional control system for a gas turbine engines is depicted with particular emphasis on how operational energy is supplied to the ignition system. In FIG. 1 an AC power source is formed by, for example, a permanent magnet alternator (PMA) 1 that is attached to the gas turbine engine (not illustrated). The PMA 1 supplies non-rectified alternating current (AC) power to an electronic control unit 2, which is configured to rectify the AC signal and supplied rectified DC power. The rectified DC power is then supplied, via an engine wiring harness, to high current demand control system components such as, for example, an ignition system 3. The ignition system 3 is shown in more detail in FIG. 2, and with reference thereto will now be described.

The ignition system 3 receives DC power from the electronic control unit 2 and comprises an ignition exciter 31 and an ignition igniter 32. The ignition exciter 31 includes a charging circuit (not shown in FIG. 2) to create the charge that is supplied to the ignition igniter 32. However, as mentioned before, the provision of an AC/DC power rectification unit 21 inside the ECU 2 increases footprint size, increases costs, and can cause EMI issues.

Thus, while presently known electronic control units are generally safe, reliable and robust, gas turbine engines having an electronic control unit that includes an AC/DC power rectification unit exhibit the above-described drawbacks, in particular a large footprint inside the ECU, and an increased weight due to the AC/DC power rectification unit in the electronic control unit and the potential challenges of electromagnetic interference and interaction as well as lightning threats.

Figure 3:
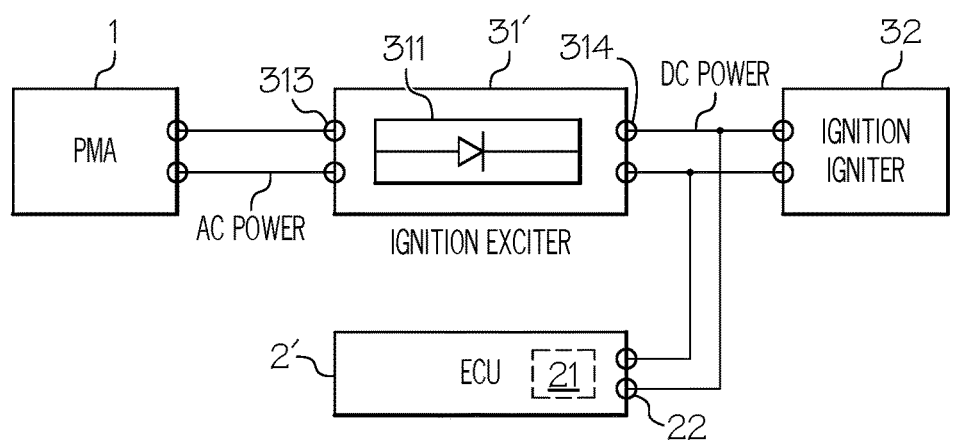
FIG. 3 shows a functional block diagram of power generation units in a gas turbine engine in accordance with the principle of the invention.

FIG. 3 shows one embodiment of an energy supply system of a gas turbine engine. The depicted ECU 2' is, as explained before, adapted to control the various functions of a gas turbine engine. It has a DC power input unit 22 coupled to receive DC power that is supplied from an ignition exciter 31' as will be explained in more detail below. The ignition exciter 31' comprises an AC power input unit 313 that is adapted to receive AC power from an AC power source 1 that may be, for example, within the gas turbine engine.

According to one embodiment, the AC power source 1 is a permanent magnet alternator PMA coupled to the gas turbine engine. As is generally known, when the PMA is rotated by a shaft of the engine, the PMA 1 generates AC power, namely an alternating voltage/current, which is received at the AC power input unit 313 of the ignition exciter 31'.

The ignition exciter 31' comprises a power rectification unit 311. The ignition exciter 31' is coupled to receive the AC power from the AC power source 1 and is configured, upon receipt thereof, to rectify the received AC power into DC power. A DC power output unit 314 of the ignition exciter 31' is coupled to receive the DC power from the power rectification unit 311 and is configured to supply the generated/rectified DC power to a DC power input unit 22 of the electronic control unit 2'. That is, the electronic control unit 2' receives, at its DC power input unit 22, the rectified DC power output by the DC power output unit 314 of the ignition exciter 31'.

As will be understood from FIG. 3, the ECU 2' is devoid of any power rectification unit 21, and instead has a DC power input unit 22 adapted to receive the generated/rectified DC power from the ignition exciter 31'. This provides major advantages with respect to the conventional power supply control systems shown in FIG. 1 and FIG. 2. Since the power rectification does not take place within the ECU 2', the problems associated with EMI are significantly reduced. Furthermore, the ECU 2' can be produced at a relatively lower cost and with a relatively smaller footprint since the components used for AC/DC power rectification are not part of the ECU 2'. Furthermore, since the ignition exciter 31' and the ECU 2' are separate units, even if electromagnetic "noise" is generated in the ignition exciter 31', this electromagnetic "noise" would not reach the ECU 2' and in particular not reach other electronic circuits provided therein. Thus, the EMI issues associated with conventional systems are remedied.

Moreover, there is no need for an electrical conduction path between the ECU 2' and the ignition igniter 32 for supplying high DC power to the ignition exciter 32. That is, in accordance with another embodiment, the ignition igniter 32 receives the DC power for charging the charging circuits directly from the power rectification unit 311 inside is the ignition exciter 31'. Thus, the ignition exciter 31' and the ignition igniter 32 can be formed as a single, integral unit, which only requires the supply of AC power from an AC power source 1, such as the permanent magnet alternator PMA. Furthermore, although not specifically shown in FIG. 3, the ignition exciter 31' may comprise a separate DC power output unit arranged separately from, but functionally similar to, the output unit 314 to supply DC supply power to the ECU 2' in addition to the other output unit 314 supplying a different supply power to the ignition igniter 32. That is, the electrical connection to the ECU 2' may be provided separately from the electrical connection path between ignition exciter 31' and ignition igniter 32.

As will be also understood by a skilled artisan, in the field of gas turbine engines the ignition system 3 comprising the ignition exciter 31' and the ignition igniter 32 is typically placed in close vicinity to the gas turbine engine, in particular to its combustion section. On the other hand, the ECU 2' depicted in FIG. 2 may be disposed separate from the ignition system 3 and may be placed anywhere near or remote from the combustion section. However, the ECU 2', since it is devoid of the power rectification unit 21 (indicated with dashed lines in FIG. 3), only requires a supply path for a DC power, that is in comparison to FIG. 1 in FIG. 2 the electronic control unit 2' in accordance with an embodiment of the invention does not need a further output path for high voltages/currents to the ignition igniter 32. Therefore, EMI can be reduced.

In some embodiments, the ECU 2' may also control other sub-units of lower power rating. For example, it may be used to supply DC power to other circuits of the gas turbine engine itself or to other circuits in the aircraft in which the gas turbine engine is installed. In such embodiments, the ECU 2' may comprise one or more step-down circuits and supply DC power(s) of relatively lower level to such electrical circuits. In this manner, the ECU 2' may be further configured to implement a DC/DC converter for feeding DC power also to other circuits. Such other circuits may include, for example, an on board battery. Unlike the conventional ECU 2 shown in FIG. 1 and FIG. 2, such an ECU 2' is devoid of a power rectification unit 21 traditionally provided in electronic control units of gas turbine engines.

Figure 4:
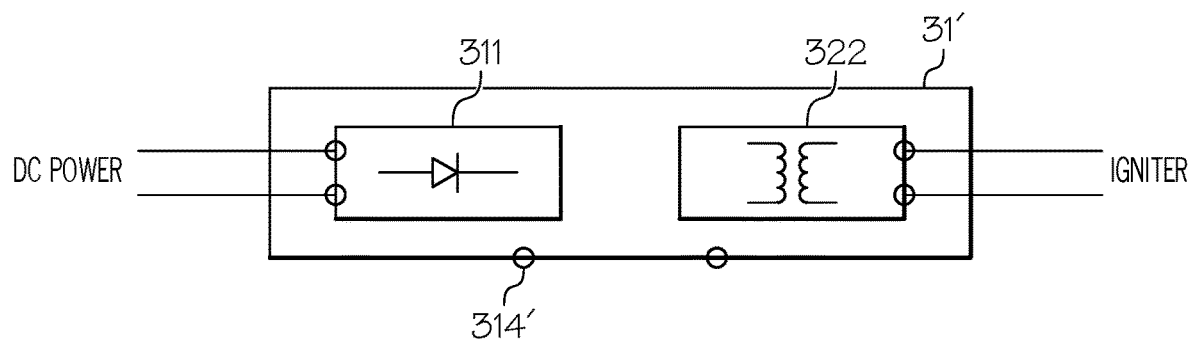
FIG. 4 shows another block diagram of a concrete embodiment of the ignition exciter shown in FIG. 3, comprising a step-down circuit.

In another embodiment, as depicted in FIG. 4, the ignition exciter 31' may also comprise further DC outputs 314' which directly supply DC power to not only the ECU 2', but also to other electrical circuits. With these embodiments, the ECU 2' need not supply the DC power to such other circuits, and is only responsible for controlling other circuits at lower voltages rather than supplying high voltage/current to other circuits. Therefore, if all DC power supply is originated in the ignition exciter 31', and possibly down or up converted, power need not to be supplied at all from the ECU 2', but exclusively from the ignition igniter 31'.

Depending on the power levels (voltage/current) needed, in some embodiments, the ignition igniter 31' may further include a step-down circuit 322. The step-down circuit 322, if included is configured to reduce the rectified DC power into a DC power of lower value. Preferably, the step-down circuit 322 comprises a transformer, as schematically indicated in FIG. 4, and the power rectification circuit 311 may comprise a half wave rectification unit or a full wave rectification unit.

As will be understood from FIG. 3 and FIG. 4, the power supplied to the ECU 2', and possibly also to the ignition igniter 32, is supplied from the ignition exciter 31'. The ECU2' may be separate from the ignition exciter 31'. The ECU2', being devoid of any internal power rectification unit, and having a DC power input 22 adapted to receive DC power can, therefore, be fabricated at lower cost and with less electromagnetic interference and with a smaller footprint which also leads to weight savings.

Figure 5:
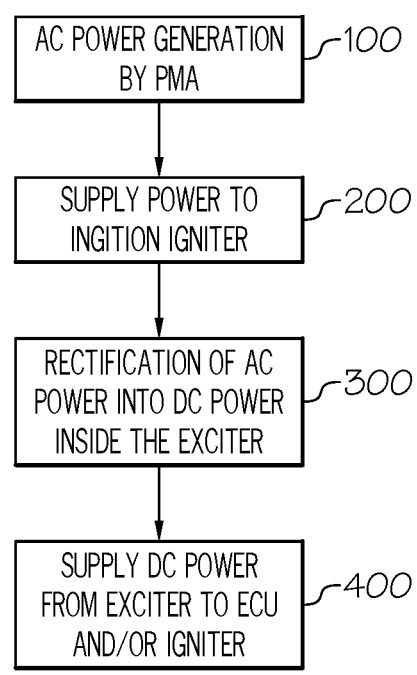
FIG. 5 shows a flowchart of supplying DC supply power to an electronic control unit of a gas turbine engine in accordance with the principle of the invention.

FIG. 5 shows one embodiment of a method for feeding DC supply power to an ECU2', such as the one depicted in FIG. 3. The method comprises a step 100 in which AC power is generated by an AC power source 1, such as a permanent magnet alternator PMA. In a step 200, the supplied AC power is fed to the ignition exciter 31', more precisely to its input unit 313. In a step 300, rectification of the AC power into DC power takes place inside the ignition exciter 31' by its power rectification unit 311. In a step 400, the DC power generated by the power rectification unit 311 inside the ignition exciter 31' is supplied to the electronic control unit 2' and, in accordance with another embodiment, is also supplied to the ignition igniter 32.

In accordance with the embodiments described herein, power rectification takes place in the ignition exciter 31', providing the advantages of less electromagnetic interference, with cost and weight savings, and with the possibility of supplying further (possibly upconverted or downconverted) DC power from the ECU2' also to other circuits or electrical consumers of the gas turbine engine or the system (for example an aircraft) in which the gas turbine engine is installed.

The embodiments are described with reference to a gas turbine engine comprising an electronic control unit and an ignition system installed in an aircraft. However, it should be noted that the various may equally be applied to any gas turbine engine installed in other systems. Furthermore, embodiments of the ECU' may be an integral part of the ignition system 3 comprising the ignition exciter 31'. However, a skilled artisan will understand that in the field of gas turbine engines, due to the various requirements/constraints, at least the ignition system 3 and the electronic control unit 2' may be provided as separate systems (units) such that the provision of the power rectification unit 311 as shown in FIG. 3 is not a question of "definition" of what constitutes an electronic control unit 2' and what constitutes an ignition system 3. In the field of gas turbine engines the ignition exciter 31' and the electronic control unit 2' are separate units and, as explained before, the ECU 2' described herein is devoid of any power rectification unit, while the ignition igniter 31' comprises a power rectification unit 311 to achieve the above-described advantages. Furthermore, the described system additionally enhances electromagnetic interference measures and thermal problems conventionally existing in known electronic control units.

In this document, relational terms such as first and second and the like may be used solely to distinguish one entity or action from another entity or action without necessarily requiring or implying any actual such relationship or order between such entities or actions. Numerical ordinals such as "first", "second", "third", etc. simply denote different singles of a plurality and do not imply any order or sequence unless specifically defined by the claim language. The sequence of the text in any of the claims does not imply that process steps must be performed in a temporal or logical order according to such a sequence unless it is specified specifically by the language of the claim. Therefore, the process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be coupled to each other physically, electronically, logically or in any other manner, through one or more additional elements.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Furthermore, while at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability or configuration of the invention in any way. Much rather, the foregoing detailed description will provide those skilled in the art with a convenient roadmap for implementing an exemplary embodiment of the invention it being understood that various changes may be made in the function and arrangement of elements described in an exemplary embodiment without departing from the scope of the invention as set forth in the following appended claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A gas turbine engine including at least a compressor section, a combustion section, and a turbine section, the gas turbine engine comprising:
   an electronic control unit adapted to control functions of each of the compressor section, the combustion section, and the turbine section of the gas turbine engine and having a DC power input unit coupled to receive DC supply power, the electronic control unit is devoid of any AC/DC power rectification;
   an ignition exciter, the ignition exciter comprising:
      an AC power input unit adapted to receive AC power from an AC power source within the gas turbine engine;
      a power rectification unit coupled to receive the AC power from the AC power source and configured, upon receipt thereof, to rectify the AC power into DC power; and
      a DC power output unit coupled to receive the DC power from the power rectification unit and configured to supply the DC power directly to the DC power input unit of the electronic control unit as DC supply power; and
   an ignition igniter coupled to the DC power output unit of the ignition exciter to directly receive the DC power from the power rectification unit.

2. The gas turbine engine according to claim 1, wherein the AC power source is constituted by a permanent magnet alternator of the gas turbine engine.

3. The gas turbine engine according to claim 1, further comprising one or more electrical consumers coupled to the DC power output unit of the ignition exciter.

4. The gas turbine engine according to claim 1, wherein the ignition exciter further includes a step-down circuit adapted to reduce the rectified DC power into a DC power of lower value.

5. The gas turbine engine according to claim 4, wherein the step-down circuit comprises a transformer.

6. The gas turbine engine according to claim 1, wherein the power rectification circuit comprises a half wave rectification unit.

7. The gas turbine engine according to claim 1, wherein the power rectification circuit comprises a full wave rectification unit.

8. A method for supplying DC power to an electronic control unit of a gas turbine engine that includes at least a compressor section, a combustion section, and a turbine section, the gas turbine engine, the electronic control unit having a DC power input unit adapted to receive DC supply power and being devoid of any internal power rectification circuit, the electronic control unit further adapted to control functions of each of the compressor section, the combustion section, and the turbine section of the gas turbine engine, the method comprising the following steps:
   generating AC power by an AC power source of the gas turbine engine;
   supplying the generated AC power to an ignition exciter of the gas turbine engine;
   rectifying said AC power in said ignition exciter into DC power;
   supplying said DC power directly to the DC power input unit of said electronic control unit as DC supply power; and supplying said DC power directly to an ignition igniter of said gas turbine engine.

9. The method according to claim 8, further comprising the step of supplying the DC power rectified in said ignition exciter to one or more other electrical consumers.

10. The method according to claim 8, further including the step of stepping down the rectified DC power into a DC power of lower value inside said ignition exciter.

\* \* \* \* \*